United States Patent [19]

Wnendt et al.

[11] Patent Number: 5,408,228
[45] Date of Patent: Apr. 18, 1995

[54] APPARATUS FOR EXPANDING THE FUNCTIONALITY OF A SERIAL DATA BUS

[75] Inventors: Jürgen Wnendt, Arnstein-Gänheim; Siegfried Scheer, Dorfen; Michael Kölbl, Vogtareuth, all of Germany

[73] Assignee: Messerschmitt-Bölkow-Blohm GmbH, Germany

[21] Appl. No.: 171,860

[22] Filed: Dec. 22, 1993

Related U.S. Application Data

[63] Continuation of Ser. No. 789,849, Nov. 8, 1991, abandoned.

[30] Foreign Application Priority Data

Nov. 8, 1990 [DE] Germany .......................... 40 35 459.8

[51] Int. Cl.6 .............................................. H04Q 1/00
[52] U.S. Cl. ............................ 340/825.52; 340/825.53; 340/825.04; 370/55
[58] Field of Search ...................... 340/825.52, 825.53, 340/825.54, 825.03, 825.04, 825.05, 826, 827; 370/55

[56] References Cited

U.S. PATENT DOCUMENTS

| | | | |
|---|---|---|---|
| 3,294,914 | 12/1966 | Müller | 370/55 |
| 4,237,447 | 12/1980 | Clark | 340/825.52 |
| 4,271,403 | 6/1981 | Severson | 340/825.04 |
| 4,574,373 | 3/1986 | Ahola | 370/55 |
| 4,761,646 | 8/1988 | Choquet | 340/825.52 |
| 4,807,149 | 2/1989 | Mehnert | 340/825.04 |
| 4,956,836 | 9/1990 | Boatwright | 340/827 |
| 5,136,583 | 8/1992 | Kondo | 340/825.05 |

Primary Examiner—Donald J. Yusko
Assistant Examiner—Brian Zimmerman
Attorney, Agent, or Firm—Evenson, McKeown, Edwards & Lenahan

[57] ABSTRACT

An electronic milbus repeater circuit for expanding the capacity of a two-wire bus used for the transmission of data. By means of logic circuitry of the Milbus repeater according to the invention, data received by the Milbus repeater is distributed between the secondary Milbus and the Milbus repeater's own internal bus according to the coded address and subaddress of each data transmission.

20 Claims, 1 Drawing Sheet

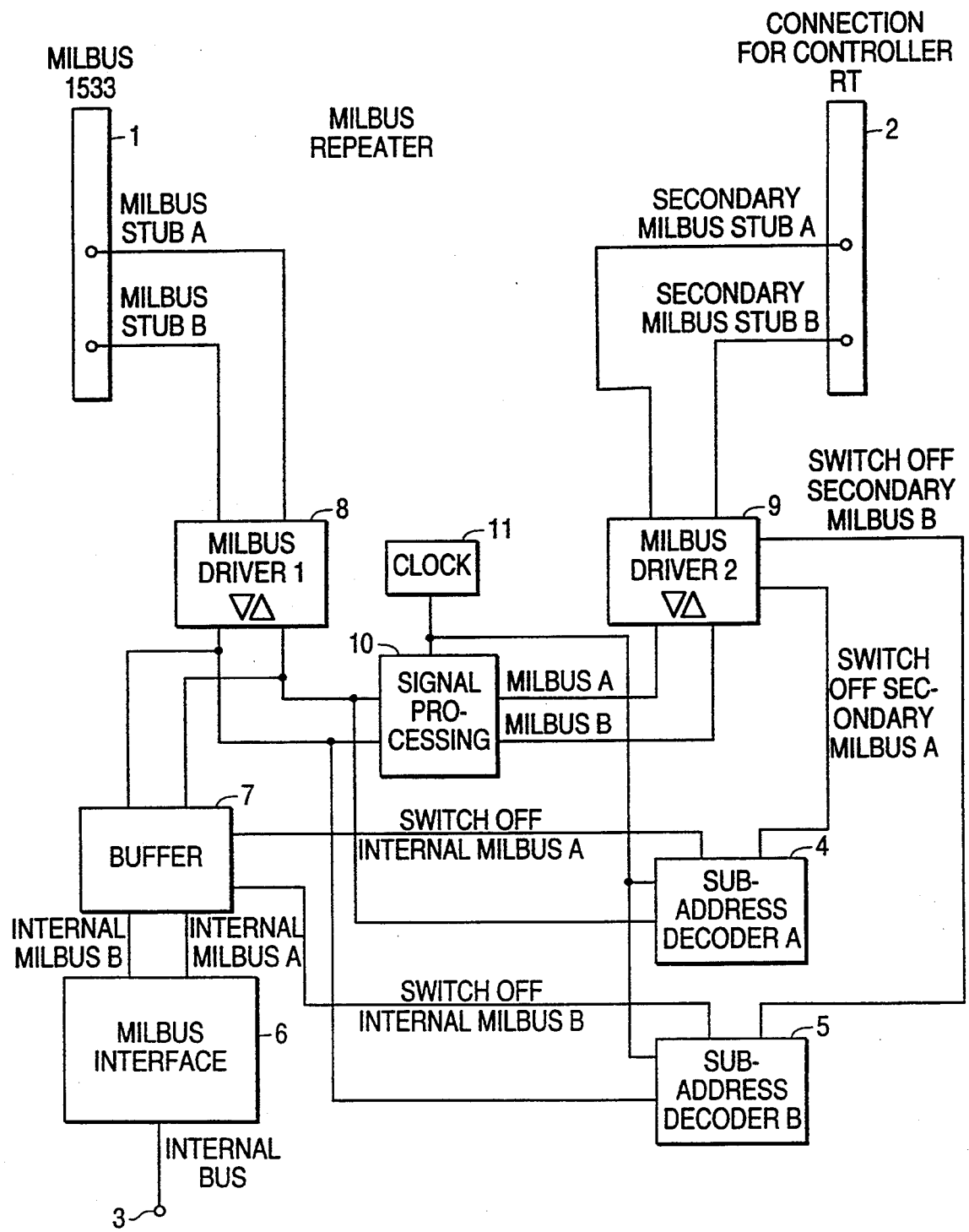

APPARATUS FOR EXPANDING THE FUNCTIONALITY OF A SERIAL DATA BUS

This application is a continuation of application Ser. No. 07/789,849, filed on Nov. 8, 1991 now abandoned.

BACKGROUND AND SUMMARY OF THE INVENTION

This invention relates to an apparatus for expanding the capacity of a serial data bus, such as the Milbus 1553, Stanag 3838 and others.

Data buses of this type, particularly the Milbus Mil-STD 1553, are considered as so-called standard elements in the military. A data bus of this type permits the use of serial data buses as a communications medium between different subsystems up to a maximum of 32. The journal *Design & Electronik*, 3rd Edition, of Feb. 7, 1989 also discusses this Milbus according to MIL-STD 1553.

The above-mentioned state of the art Milbuses comprise, among other things, a two-wire bus to which the bus controller and up to 32 general remote terminals (RT's) may be connected by way of stubs. Often two redundant buses are designed in parallel so as to be able to switch to the second bus in the case of disturbances. Such redundant buses are commonly referred to as bus A and bus B.

The limitation to 32 RT's is the result of the number of the available addresses, and the fact that only one RT can be connected to each of the respective stubs. Nevertheless, certain applications may require connection of additional remote terminals to the bus. Problems occur, however, in the expansion of existing systems if all 32 RT addresses have been allocated or if, for the connection of additional RT's, when the bus configuration has been established, no more access can be created to the actual bus, and therefore a connection to an already used stub must take place.

In principle, it is possible to solve this problem by using a standard RT with a standard bus controller BC. The RT is operated on the stub of the Milbus and transmits data (commands) to the bus controller (BC) of another Milbus. Up to 32 RT's may then be connected to this secondary Milbus.

The disadvantage of this solution is, however, that all data/commands must first be completely received by the RT-BC apparatus and only then can be actively transmitted to the secondary Milbus. As a result, too much time may be lost to accommodate time critical applications—which are frequent in the military sector. Furthermore, errors which occur on the second Milbus require special handling because no transparent access exists to the connected RT or RT's.

It is an object of the present invention to provide an apparatus of the initially mentioned type by which the above-mentioned disadvantages of the state of the art are eliminated, and by which a transparent connection of several RT's to one RT-address (to one stub) with almost no delay is made possible.

This object is achieved by the Milbus repeater according to the invention, in which the bus controller unit for the second Milbus is replaced by so-called transparent hardware logic, described in detail hereinafter. This hardware logic transmits the Milbus traffic from the primary bus almost without any loss of time directly to the secondary bus and vice versa. Because the address of the general remote terminal RT of the Milbus repeater will now be identical with the address of an RT connected to the secondary Milbus, additional logic circuitry is provided in order to control the distribution of data.

Other objects, advantages and novel features of the present invention will become apparent from the following detailed description of the invention when considered in conjunction with the accompanying drawings.

BRIEF DESCRIPTION OF THE DRAWINGS

The single FIGURE is a block diagram of the Milbus repeater for a redundant Milbus 1553, in accordance with the invention.

DETAILED DESCRIPTION OF THE DRAWINGS

By means of the logic circuitry of the Milbus repeater according to the invention as shown in the block diagram of the FIGURE, data received by the Milbus repeater via Milbus 1553 (reference numeral 1) is distributed between the secondary Milbus 2 and the Milbus repeater's own internal bus 3 according to the coded address and subaddress of each data transmission. That is, while both the secondary and internal Milbuses have the same address, they have different subaddresses. When the Milbus repeater illustrated in the FIGURE detects its own address and its own subaddress in a transmitted command, it prevents the further transmission of the associated commands to the secondary bus. For this purpose, the two subaddress decoders A and B (reference numerals 4 and 5) are provided which, at the start of each transmission detect the transmitted address and subaddress. When the detected address matches that of the Milbus repeater, subaddress decoders A and B switch off whichever Milbus (internal Milbus 3 or the secondary Milbus 2) is not addressed by the subaddress; that is, the line is switched off electrically. Thus when the address and subaddress match that of the internal Milbus, a connected RT on the secondary bus is forced to ignore the received command segment. (In this regard, see MIL-STD 1553 B, Point 4.4.3.3.)

Likewise, upon receipt of commands directed to the secondary bus (for which the address is the same as that of the internal Milbus, but, the subaddress is different), the Milbus repeater's own internal RT is disconnected. As a result, two RT's—specifically, the RT on the secondary bus 2 and that on the internal bus 3 in the Milbus repeater—can operate with the same RT address on the Milbus.

By the connection of further Milbus drivers, additional RT's may be operated with the same RT address on their own buses. It should only be observed in this regard that for the RT's with the non-addressed subaddresses, the respective command word is interrupted. By means of a signal processing device in the Milbus repeater, the signal form on the secondary bus is maintained according to the Mil-Specification 1553 supplied from the start.

It should also be noted that, if the Milbus repeater and the RT on the secondary bus 2 are assigned two different addresses, no intervention into the data traffic is necessary because in such case only one of the two RT's considers itself addressed, and, the task of the above-described Milbus repeater is limited to the physical processing of the signals.

In the Figure, Milbus interface 6 is an RT according to the Milbus Standard 1553, and the buffer 7 is used to switch off the internal connection between the Milbus repeater and its own internal Milbus 3. The two Milbus drivers 1 and 2 (reference numerals 8, 9) are used for generating the signal characteristics as specified in MIL-STD 1553B for the transmission to the Milbus 1553. Furthermore, the Milbus driver 2 (reference numeral 9) is used for switching-off the Milbus-to-secondary-Milbus connection. The signal processing unit 10 is used to reformat the received signals to guarantee MIL-STD 1553B compatible transmission. That is, in response to a clock pulse generated by clock 11, a data signal received via the Milbus is scanned and is reissued in a synchronized form in a known manner. At the start of each transmission, subaddress decoders A and B (reference numerals 4, 5) detect the transmitted address and subaddress and, when the 25 address matches that of the Milbus repeater, they switch off the internal or secondary Milbus, whichever is not addressed by the subaddress.

The operation sequence of the Milbus repeater according to the invention is as follows:

In case of a transmission from the primary milbus 1 to the internal milbus interface 6 a valid command word for the secondary milbus (address, subaddress) must not be transmitted on the secondary milbus 2, and vice versa.

In a transparent phase of operation, milbus driver 1 (reference numeral 8) receives data on the primary bus and drives the internal signal path. Up to the point when an address and subaddress has been transmitted on the primary milbus, all received signals must be reformatted by the signal processing unit 10 and transmitted by milbus driver 2 (reference numeral 9). The buffer 7 drives the internal milbus in parallel, to guarantee a transparent access with minimum time delay to any remote terminal connected to the milbus repeater, whether it is the remote terminal on the secondary milbus 2 or the internal milbus interface.

The incoming command word is monitored for the RT-address and subaddress(es) of the remote terminal on the secondary milbus and the internal remote terminal. For this purpose the subaddress decoders A/B (reference numerals 4 and 5) decode incoming milbus command words on the fly.

In a switch-off phase, as soon as a subaddress decoder (either A or B) (reference numeral 4 or 5) has received and decoded the RT-address and the subaddress of the incoming command word, a decision must be made whether to switch-off the transmission of the command word on the internal milbus 3 or the secondary milbus 2 or not.

If the remote terminal on the secondary milbus 2 is addressed, transmission on the secondary milbus will continue. The milbus driver 9 will continue to transmit the reformatted command word on the secondary milbus. Any further transmission of the command word on the internal milbus will be discontinued by the buffer 7. As a result, the remote terminal on the secondary milbus will be the terminal addressed by the milbus command word being sent. The internal milbus interface 6 will ignore the incompletely received milbus command and won't reply with a status. (See MIL-STD 1553B, Point 4.4.3.3.)

If the remote terminal on the internal milbus 3 is addressed, transmission on the internal milbus will continue. The milbus buffer 7 will continue to transmit the reformatted command word on the internal milbus. Any further transmission of the command word on the secondary milbus 3 will be discontinued by the milbus driver 9. As a result, the remote terminal on the internal milbus 3 will be the terminal addressed by the milbus command word being sent. The remote terminal on the secondary milbus will ignore the incompletely received milbus command and won't reply with a status. (See MIL-STD 1553B, Point 4.4.3.3.)

If neither of the remote terminal on the internal milbus 3 nor the remote terminal on the secondary milbus 2 is addressed, transmission on both the internal and secondary milbus will continue. Both the milbus buffer 7 and the milbus driver 9 will continue to transmit on either bus. Thus, both the remote terminal on the internal milbus and the remote terminal on the secondary milbus will be able to receive the actually sent milbus command word. This is done to ease the handling of some modecodes and of broadcast messages.

During a data/status transmission phase, any milbus data word(s) directly following the command word will pass the milbus repeater section depending on the switch-off state. That is, a switched-off milbus driver or buffer will remain switched-off during this data transmission, and a switched-on milbus driver or buffer will remain switched-on during this data transmission.

During an idle-phase of the milbusses, the signal processing unit 10 monitors milbus traffic on the milbusses and, in addition to the "command word processing", switches any traffic from the secondary milbus or the internal milbus to the primary milbus. As a result, the status word and any data word(s) being transmitted by either the internal remote terminal or the remote terminal connected to the secondary milbus will be switched to the primary milbus. This make transparent access possible to both the remote terminal connected to the secondary milbus or to the internal milbus interface 6.

During data transmission from the secondary milbus to the primary milbus the internal milbus 3 is disconnected by the buffer 7 so that the internal milbus interface won't recognize the status word from the secondary milbus interface as a command word.

Similarly, during data transmission from the internal milbus interface 6 to the primary milbus, the secondary milbus 2 is disconnected to the associated milbus driver 9 so that the remote terminal on the secondary milbus won't recognize the status word from the internal milbus interface as a command word Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for expanding capacity of a first serial data bus configured to be connected to a bus controller and a plurality of remote terminals, said apparatus comprising:

an internal serial data bus having a remote terminal connected thereto, said internal data bus being accessible by command signals having a first predetermined address code transmitted via said first serial data bus;

a secondary serial data bus for interconnecting a plurality of additional remote terminals, said secondary serial data bus being accessible by command signals having a predetermined address code transmitted via said first serial data bus, said predetermined address code being identical to said first predetermined address code;

logic circuitry for transmitting command signals having an address code and a subaddress code associated therewith, from said first serial data bus concurrently to said internal serial data bus and to said secondary serial data bus;

a subaddress decoder for monitoring command signals transmitted via said first serial data bus, and for terminating transmission thereof to said internal serial data bus when a command signal is received having said first address code and a first predetermined subaddress code corresponding to said secondary serial data bus, and terminating transmission thereof to said secondary serial data bus when a command signal is received having said first address code and a second predetermined subaddress code corresponding to said internal serial data bus, said second predetermined subaddress code being different from said first predetermined subaddress code.

2. Apparatus according to claim 1, wherein the bus interface comprises a remote terminal.

3. An apparatus according to claim 1, wherein the buffer comprises a switch-off device for connection from the first serial data bus to the internal databus.

4. An apparatus according to Claim 2, wherein the buffer comprises a switch-off device for connection from the first serial data bus to the internal databus.

5. An apparatus according to claim 1, wherein the first and second bus drivers comprise generators for signal characteristics conforming to a predetermined specification, for transmission of data to the first serial data bus.

6. An apparatus according to claim 2, wherein the first and second bus drivers comprise generators for signal characteristics conforming to a predetermined specification, for transmission of data to the first serial data bus.

7. An apparatus according to claim 3, wherein the first and second bus drivers comprise generators for signal characteristics conforming to a predetermined specification, for transmission of data to the first serial data bus.

8. An apparatus according to claim 4, wherein the first and second bus drivers comprise generators for signal characteristics conforming to a predetermined specification, for transmission of data to the first serial data bus.

9. An apparatus according to claim 1, wherein the signal processing unit is adapted for reformatting the received signals to guarantee compatibility with a predetermined specification for data transmission and, by means of a clock generator, for signal scanning and for synchronized signal output.

10. An apparatus according to claim 2, wherein the signal processing unit is adapted for reformatting the received signals to guarantee compatibility with a predetermined specification for data transmission and, by means of a clock generator, for signal scanning and for synchronized signal output.

11. An apparatus according to claim 3, wherein the signal processing unit is adapted for reformatting the received signals to guarantee compatibility with a predetermined specification for data transmission and, by means of a clock generator, for signal scanning and for synchronized signal output.

12. An apparatus according to claim 4, wherein the signal processing unit is adapted for reformatting the received signals to guarantee compatibility with a predetermined specification for data transmission and, by means of a clock generator, for signal scanning and for synchronized signal output.

13. An apparatus according to claim 5, wherein the signal processing unit is adapted for reformatting the received signals to guarantee compatibility with a predetermined specification for data transmission and, by means of the clock generator, for signal scanning and for synchronized signal output.

14. An apparatus according to claim 1, wherein the subaddress decoders are adapted to detect the address and subaddress of signals received via the first serial data bus and to switch-off a respective non-addressed bus.

15. An apparatus according to claim 2, wherein the subaddress decoders are adapted to detect the address and subaddress of signals received via the first serial data bus and to switch-off a respective non-addressed bus.

16. An apparatus according to claim 3, wherein the subaddress decoders are adapted to detect the address and subaddress of signals received via the first serial data bus and to switch-off a respective non-addressed bus.

17. An apparatus according to claim 4, wherein the subaddress decoders are adapted to detect the address and subaddress of signals received via the first serial data bus and to switch-off a respective non-addressed bus.

18. An apparatus according to claim 5, wherein the subaddress decoders are adapted to detect the address and subaddress of signals received via the first serial data bus and to switch-off a respective non-addressed bus.

19. An apparatus according to claim 7, wherein the subaddress decoders are adapted to detect the address and subaddress of signals received via the first serial data bus and to switch-off a respective non-addressed bus.

20. An apparatus according to claim 9, wherein the subaddress decoders are adapted to detect the address and subaddress of signals received via the first serial data bus and to switch-off a respective non-addressed bus.

* * * * *